United States Patent [19]
Dupuy et al.

[11] Patent Number: 5,317,835
[45] Date of Patent: Jun. 7, 1994

[54] WINDOW ENCLOSURE FOR AN AUTOMOTIVE UPPER DOOR FRAME

[75] Inventors: Ronald E. Dupuy; Steven E. Schneider, both of Wabash, Ind.

[73] Assignee: GenCorp Inc., Fairlawn, Ohio

[21] Appl. No.: 942,867

[22] Filed: Sep. 10, 1992

[51] Int. Cl.⁵ .................................................. E06B 7/16
[52] U.S. Cl. ........................................ 49/441; 49/377; 49/502
[58] Field of Search ............... 49/440, 441, 502, 374, 49/375, 376, 377, 378

[56] References Cited

U.S. PATENT DOCUMENTS

| | | | |
|---|---|---|---|
| 4,656,784 | 4/1987 | Brachmann | 49/441 X |
| 4,800,681 | 1/1989 | Skillen et al. | |
| 4,843,763 | 7/1989 | Mesnel | |
| 4,864,774 | 9/1989 | Onishi et al. | |
| 4,875,307 | 10/1989 | Barbero | |
| 4,970,828 | 11/1990 | Mesnel et al. | |
| 5,001,867 | 3/1991 | Dupuy | 49/441 X |
| 5,010,689 | 4/1991 | Vaughan | 49/440 |
| 5,027,556 | 7/1991 | Ginster | 49/441 |
| 5,076,638 | 12/1991 | Andexlinger et al. | 49/374 X |

OTHER PUBLICATIONS

Prior Art drawing representing an assembly currently sold by Kingston–Warren Division of Harvard Industries, Seabrook, N.H.

*Primary Examiner*—Philip C. Kannan

[57] ABSTRACT

A window enclosure strip is provided for a window mounted in a vehicle door. The strip includes a mount channel which cooperates with a mount member on the door. The strip also includes a glass run portion having an exterior glass contacting member and an interior glass contacting member which form a seal with the window pane when the window pane is in a closed position in the vehicle. Further, the seal strip includes a self-trim for the door interior and exterior. The mount channel is formed of a relatively stiff material so as to eliminate the need for an additional stiffening member. On the other hand, the interior and exterior glass sealing members are relatively soft for the purposes of sealing against water, air, and noise. A continuous cut-line seal is provided to bridge the gap between the door and the body and reduce wind noise and water intrusion.

14 Claims, 9 Drawing Sheets

WINDOW ENCLOSURE FOR AN AUTOMOTIVE UPPER DOOR FRAME

FIELD OF THE INVENTION

The present invention relates to window seals for the upper frames of automotive doors, and in particular to a window seal which generally is a one-piece member, integrating several functional components formable by a simplified process.

BACKGROUND

Heretofore, the structure of automotive doors above the belt line of the door, or the door glass frame, has been trimmed, sealed, and styled with numerous components which have been combined to form the window seal. The door glass has been sealed with a separate glass run assembly, and inner and outer belt strip assemblies. The glass run and belt strip assemblies have been trimmed on the interior of the automobile or other vehicle with separate trim components or the glass run assembly itself has provided the trim effect. The glass run on the exterior of the vehicle has been likewise trimmed with separate assemblies, escutcheons or separate appliques designed to meet the specific styling requirements of the vehicle. However, construction of the sealing, trimming and styling article for the upper window frame of an automotive door has been relatively expensive and particularly cumbersome to accomplish given the numerous components comprising the assembly. In the instance where an integral cutline seal/glass run/channel sealing strip has been used, it has failed since the function of the cutline seal often interferes with the sealing strip.

SUMMARY OF THE INVENTION

Objectives of the present invention include providing a window enclosure for the upper frame of automotive doors which provides the functions of sealing, trimming and styling the window frame in a generally integral one-piece formed article. Moreover, the function of the window and door sealing elements are isolated from each other as well as from the mount elements. Thus, while the window enclosure strip is an integral unit, the cutline seal functions independently of the window seal. Another object of the present invention is to form such a window enclosure which is relatively simple and economical to manufacture.

Another objective of the present invention is to provide a unitary window enclosure which receives a moveable window and when the window is closed provides for a closure sealed against the intrusion of water, dirt, wind, and noise. It is a further advantage to provide for such an enclosure which can be preformed or preassembled as to reduce assembly-line inefficiencies.

It is a further advantage to provide a window enclosure for a single window or a plurality of windows, such as a fixed window and a moveable window, in which the window enclosure has a first side member, a top member, and a second side member so as to generally form an inverted U-shape which along with the belt-line of a door panel will define a quadrilateral opening, and at least two sides of the inverted U-shaped opening is framed by a continuous formed enclosure member or incorporates a continuous sealing strip. This helps to provide for a continuous seal around the glass and to eliminate visible splice lines.

It is of further advantage to provide an integral window enclosure having an attractive appearance and providing clean and relatively low-profile (i.e., flush) exterior profile to decrease wind resistance and thereby increase fuel efficiency and reduce noise.

It is an advantage to provide a window enclosure having a relatively stiff or high durometer mount channel integrally joined with relatively flexible or soft interior and exterior glass sealing members which optionally may include low friction surfaces, and further joined with exterior trim components, such as a glass surround, which may include an enhanced appearance through attention to color or exterior surface characteristics. For example, a bright or contrasting color insert may be extruded to enhance styling without requiring an additional coating.

The present invention further provides for a door edge which is trimmed and protected. It provides a continuous cut-line seal bridging the gap between the door and the body and subsequently reducing wind noise and water intrusion.

BRIEF DESCRIPTION OF THE DRAWINGS

Similar numerals refer to similar parts throughout the drawings.

DETAILED DESCRIPTION OF THE INVENTION

Figure 1:
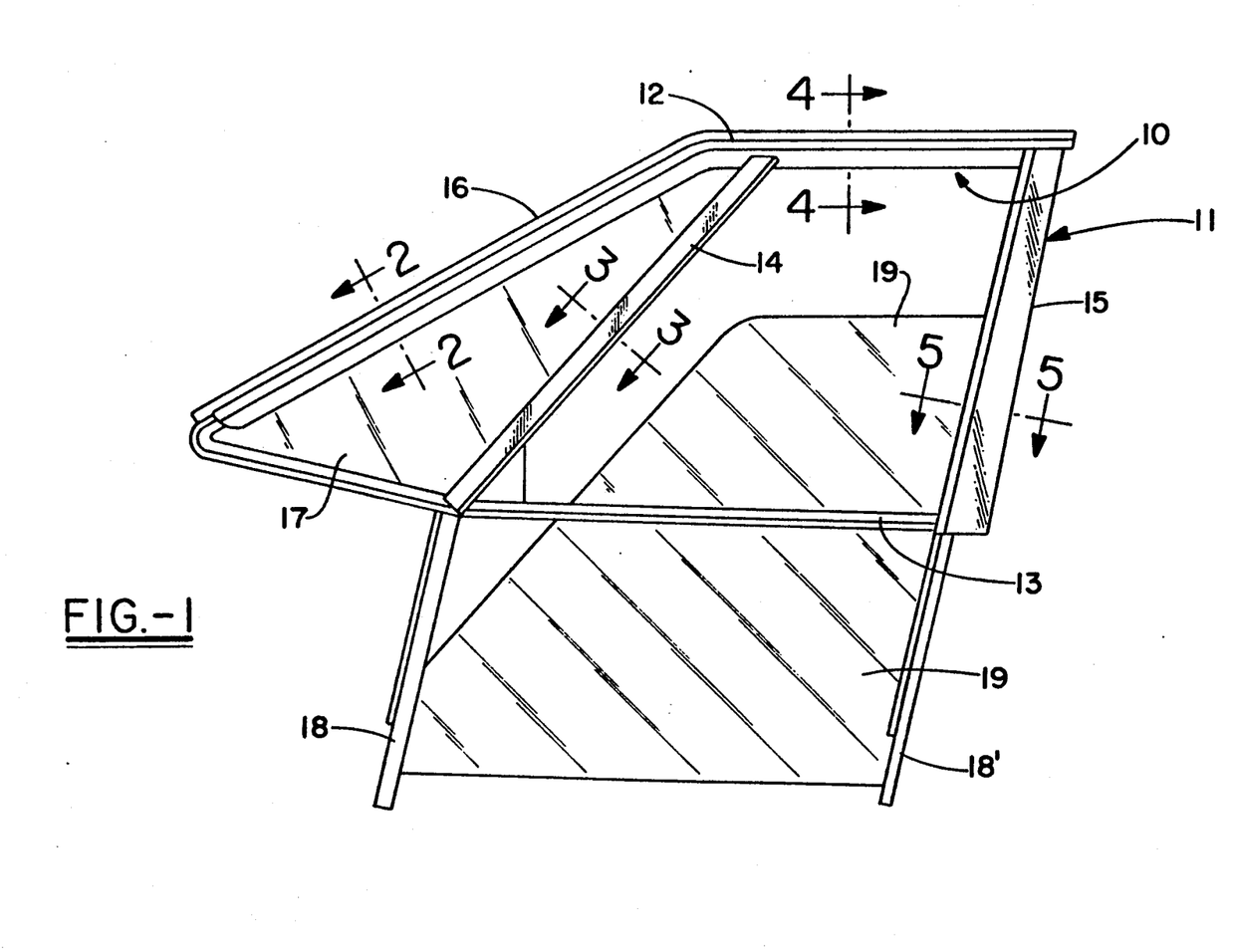
FIG. 1 is an interior elevational view of the upper frame of an automotive front door, incorporating the window enclosure of the present invention and showing the door glass in a partially open position.

The window enclosure of the present invention is indicated generally at 10 and is shown installed in the upper frame of a front automotive door in FIG. 1. Upper frame 11 includes a header 12, belt line portion 13, and a division bar 14, an A-pillar 16 and a B-pillar 15 which each extend between belt line 13 and header 12. Division bar 14 and the most frontward portions of header 12 and belt line 13 form a subframe within upper frame 11 for retaining a vent window 17. This vent window is shown as a fixed window. The most rearward portions of header 12 and belt line 13, together with division bar 14 and B-pillar 15 capture vertically reciprocating window 19 within upper door frame 11. Horizontally spaced and vertically disposed guide channels 18 and 18' assist in maintaining window 17 in the proper orientation during opening and closing thereof.

Figure 2:
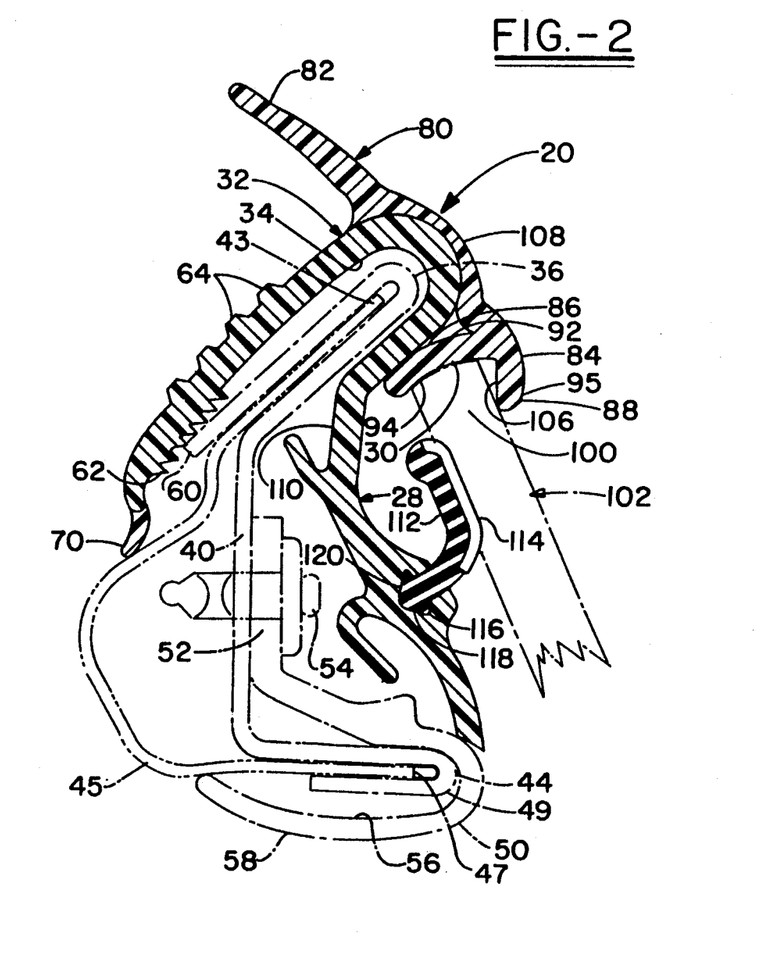
FIG. 2 is a sectional view taken on line 2—2 of FIG. 1, particularly showing the window enclosure of the present invention mounted on a portion of the window frame structure shown in phantom lines, and further showing the window glass in phantom lines engaging the window enclosure.
Figure 3:
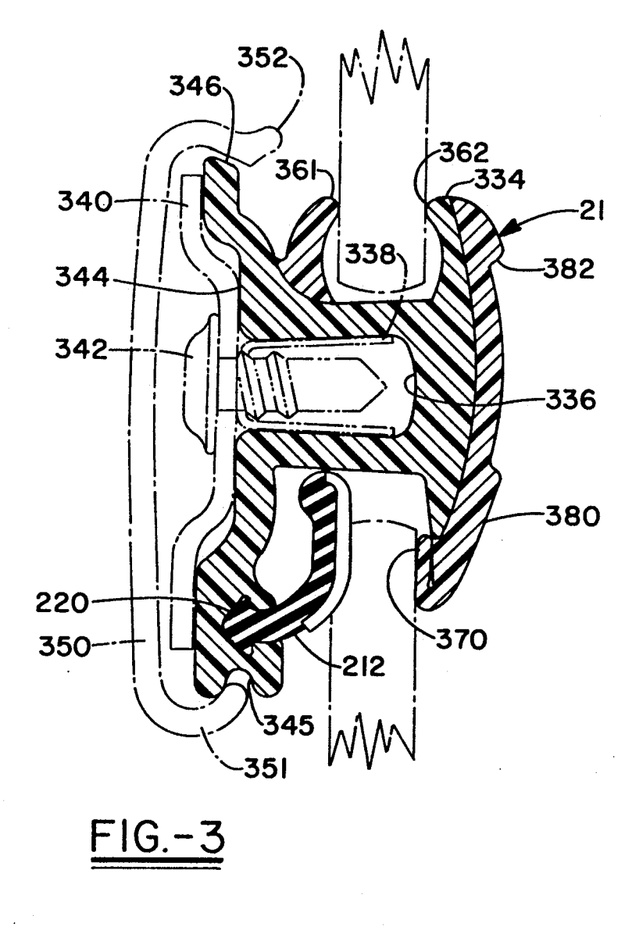
FIG. 3 is a sectional view similar to FIG. 2, taken on line 3—3 of FIG. 1.
Figure 4:
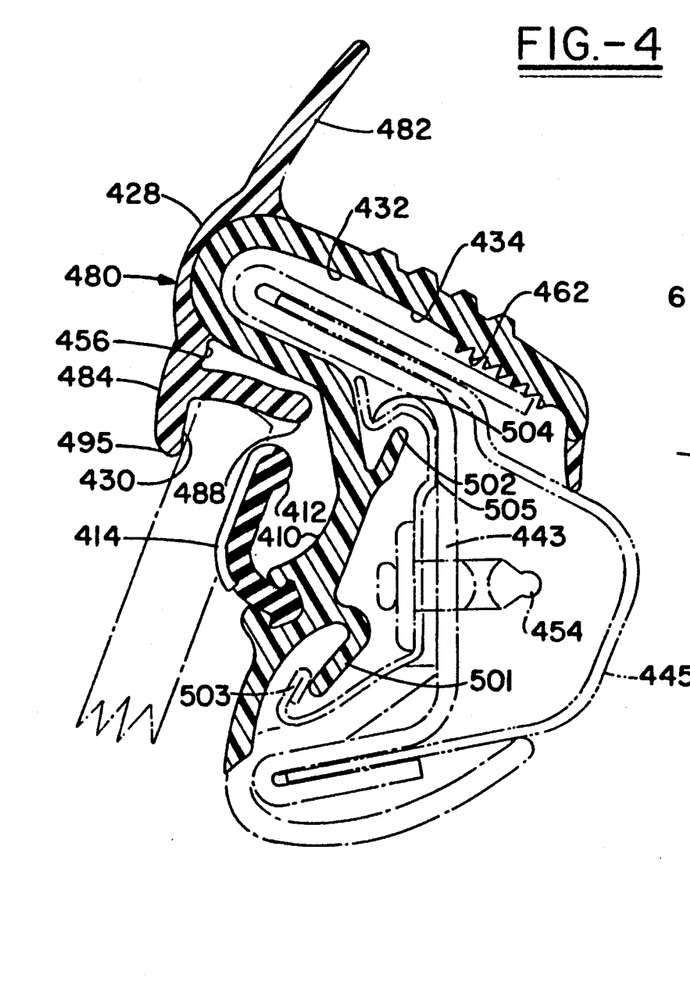
FIG. 4 is a sectional view similar to FIGS. 2 and 3, taken on line 4—4 of FIG. 1.
Figure 5:
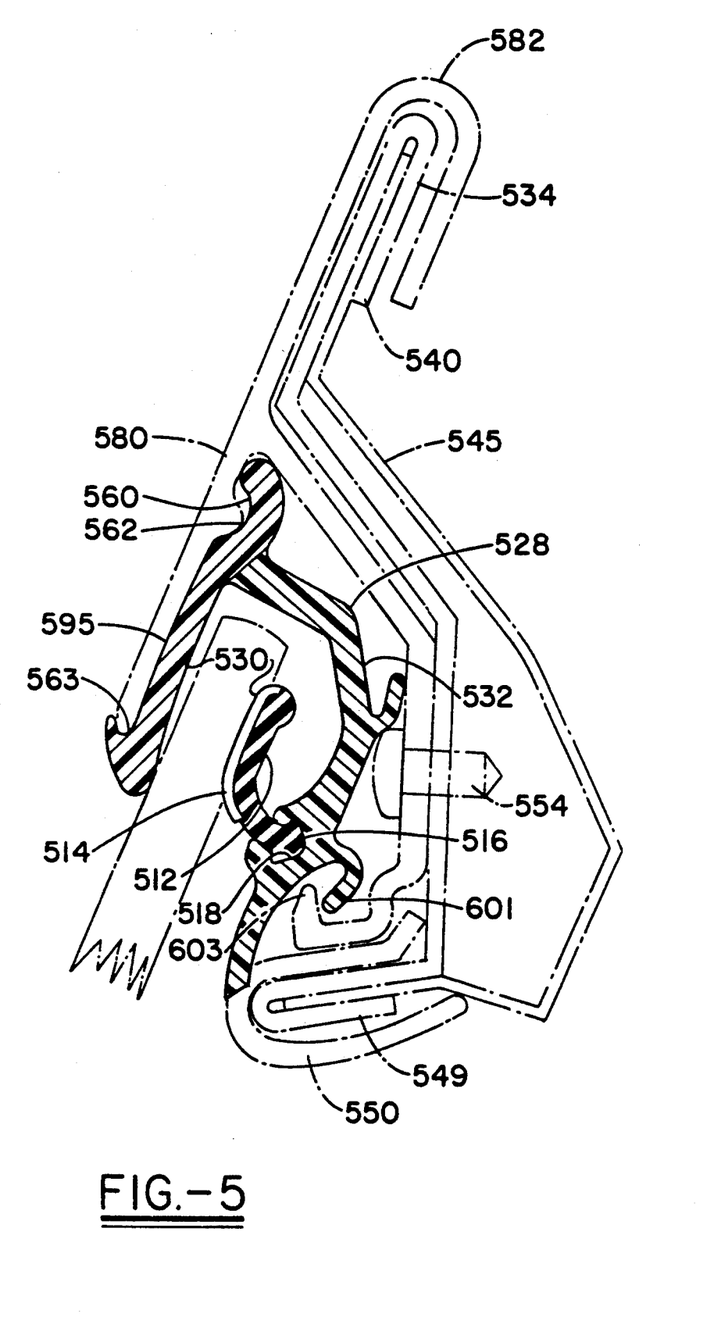
FIG. 5 is a sectional view similar to FIGS. 2-4, taken on line 5—5 of FIG. 1.

In particular, window enclosure 10 comprises an A-pillar header section 20 shown in FIG. 2 and header shown in FIG. 4, a division bar section 14 shown in FIG. 3 and a B-pillar section 15 shown in detail in FIG. 5.

In accordance with one of the features of the present invention, various components of window enclosure 10 are formed of thermoplastic elastomers of varying durometers.

Thermoplastic elastomers generally are useful in forming the window enclosure of the present invention because they combine the mechanical properties of a thermoset rubber with the production increment economics of a thermoplastic polymer. Since thermoplastic elastomers contain hard and soft segments or domains in the polymer molecular compound, the soft regions provide the rubber-like elastomer properties while the hard regions act as mechanical crosslinks, tying down the rubber section and thus adding strength and toughness to the thermoplastic elastomer. At processing temperature, the hard segments melt or soften to yield a molten plastic that can be easily processed by varying thermoforming processes including, for example, injection molding, extrusion, and the like.

FIG. 2 represents a view of the A-pillar of the window enclosure in cross section and generally comprises a multifunctional polymeric window receiving sealing trim strip 28, which performs as a glass run channel 30 to accept the glass portion of the window and which includes a U-shaped mounting portion 32 and various sealing components. The mounting portion 32 includes an internal channel 34 which cooperates with a mounting flange 36 formed on the interior portion of the upper door frame 45. More particularly, the mounting flange 36 is comprised from a metal clamp 40 which includes a first fold 42 that embraces an edge 43 of the door frame. The clamp 40 also includes a second fold 44 which embraces a lower edge 47 of the interior portion of the upper door frame 45. This fold 44 forms a second mount flange 49. The mounting portion 32 of the strip is preferably made of a relatively rigid material which maintains a relatively constant durometer over a wide temperature range, i.e., typically from −40° C. to 180° C. A suitable durometer is from about 80 Shore A to about 50 or 60 Shore D, and preferably from about 90 to about 100 Shore A. The mounting portion 32 forms a rigid backbone which won't deflect under the typical pressure of a hand but which is flexible enough for assembly. A suitable material is an ABS/PVC alloy under the tradename Polyvin sold by A. Shulman.

In the embodiment shown in FIG. 2, the second mount flange 49 receives a separate trim strip 50 which is secured at one end 52 to the clamp 40 by suitable means such as pin 54. The other end of the trim strip 50 includes a channel 56 which partially surrounds the second flange 49 and which includes a trim face 58 that extends inward to cooperate with the interior portion of the door frame 45. In this embodiment, the window receiving-sealing-trim strip 28 extends down exterior to the clamp 40 so that it cooperates with the trim strip 50. However, it should be understood that the window receiving sealing trim strip 28 can also include the trim strip 50.

The internal channel 34 of the window receiving-/sealing/trim strip 28 includes one or more integral protrusions which cooperate with the mount flange 36 to secure the strip 28 into position relative to the door frame 45. More particularly, these protrusions may be a plurality of triangular serrations which cooperate with the edge 60 of the fold 42 and which snap into position so that an internal shoulder 62 of a serration biases the mount channel 34 into position unto the mounting flange 36.

On the upper surface the strip 28 includes a series of ridges 64 which enhance the appearance along the upper edge of the door frame 11 when the door is open. Further, these ridges 64 may serve to provide additional stiffening properties to the strip 28.

On the lower edge, the strip 28 extends into a pigtail 70 which extends along the interior side of the door frame member 42 and which provides a finished appearance as well as sealing the door frame from the intrusion of dust. This pigtail member 70 is shown as being comprised of a softer and more flexible material than the mount channel portion 34 of the strip 28. This flexibility provides a more continuous forgiving interface with the interior door frame 45.

At the apex end, the mount channel member 34 includes exterior trim and sealing portion 80. This sealing portion 80 includes a flange 82 which extends upward from the mount channel member 34. The flange 82 seals the cut-line, i.e., the gap found between the vehicle body (not shown) and the upper door frame when the door is closed. This seal is accomplished independently of the sealing of the window. Of course, it therefore should be understood that the flange 82 is of sufficient length to flex or buckle into the cut-line, and consequently to seal the gap against the intrusion of dirt, wind, and water. The exterior trim and sealing portion 80 is made of a material which meets the specific sealing characteristics and the appearance standards. For example, the material may be a thermoplastic with very low compression set, i.e., 25–50 percent, and preferably 25–35 percent as measured by ASTM test D 395 Method; the material has very high range of gloss, such as 30° to 80° as measured using a glossmeter using ASTM D 523. Further, it is preferable that the material can be coextruded with the material used for the backbone. Suitable materials include those sold under the tradename of Sunprene by A. Shulman, and under the tradename Alcryn by DuPont.

Opposite the flange 82, the trim and sealing portion 80 extends towards the window aperture and forms a T-shaped member 84 having a first arm 86 which serves to hold the cross arm 88 of the T-member 84 in position extending into and across the window aperture. The cross arm 88 has a first lateral surface 92 which opposes the mount channel member 34, and a second lateral surface 94 which forms the inside (i.e. the bottom of the channel) for the glass run channel 100. Thus, when the glass pane 102 (shown in phantom) is in a closed position, the lateral surface of the pane contacts the surface 94. Thus, the window exerts a force on the glass run channel at an angle of 0°–20°; preferably at an angle of 5°–10°, approximately in a direction parallel to the plane of the window pane. The mount channel has a mount slot which is substantially perpendicular to a plane defined by the glass run channel. By substantially perpendicular is meant that the angle of the plane of the slot defined by the mount channel member 34 is from about 70° to about 110° to the plane defined by the slot of the glass run channel (i.e., substantially perpendicular). In particular, since the T-shaped member is comprised of a relatively soft material, the arm 86 buckles when the window glass is closed, so that the cross arm 88 contacts the mount channel member 34 and provides further stability to the window assembly. Extending from the cross arm 88 is a lip 95 which forms the other side relative to member 86 of the T-bar. The lip 95 extends into the window aperture in the direction of, but exterior to the window pane. The interior surface 106 joins the cross arm 88 to form a longitudinal side of the glass run channel. This surface 106 contacts the exterior surface of the window pane when the window pane is closed to form a first seal against the intrusion of air, water, and dirt.

The length of the arm 86 and the angle of the lip 95 relative to the window, along with the general shape of the T-member are such that the exterior surface bulges in cross-section to mirror the shape of the trim area 108. A similar bulge in the cut-line seal 82 gives a symmetry to the profile of the strip when the car window and door are closed. The design eliminates the need for further trim and the material can be selected to provide a particular surface appearance. The shape of the trim and sealing portion as well as the use of a relatively soft material, i.e. having a durometer of Shore A of about 60 to about 75, and preferably about 70 to about 75, allows for a wide tolerance as to the window pane size and fit and the door sizes and fit in the vehicle.

The mount channel member 34 is comprised of a harder, i.e. more rigid, material which has a durometer of from about 85 to about 100 Shore A, and preferably from about 90 to about 95 Shore A. This provides for a more rigid cooperation with the door frame and a more rigid glass run channel.

Extending along the mount flange 36, the channel mount member has an exterior leg 110. Joined with the exterior leg 110 is a gasket member 112. The gasket member 112 is made of a flexible material, i.e. having a durometer of from about 60 to about 75 Shore A, and more preferably from about 70 to about 75 Shore A. A suitable material is, for example, EPDM rubber, and the like. The flexibility of the gasket relative to the mount member 34 helps to isolate the function of the gasket members 112, 95 from the mount member 34.

The gasket 112 has a glass contacting surface 114. The gasket has a backward bias relative to its juncture with the channel mount member 34 so that the gasket flexes inward as the window is closed and is thus biased into sealing position.

The glass contacting surface 114 is the exterior side of the gasket relative to the exterior and interior of the vehicle. The glass contacting surface 114 may include a low friction surface as is shown which may be comprised of any suitable material. Such as a flocking or silicone type surface.

The gasket 112 may be formed as part of the window receiving/sealing/trim strip 28 or alternatively may be formed as an additional member which is subsequently joined with the strip 28. In the latter method, the gasket may include a double shouldered anchor portion 116 having a tapered head 118 which slides into a locked position with a correspondingly shaped groove 120 in the channel mount member 34.

Figure 6:
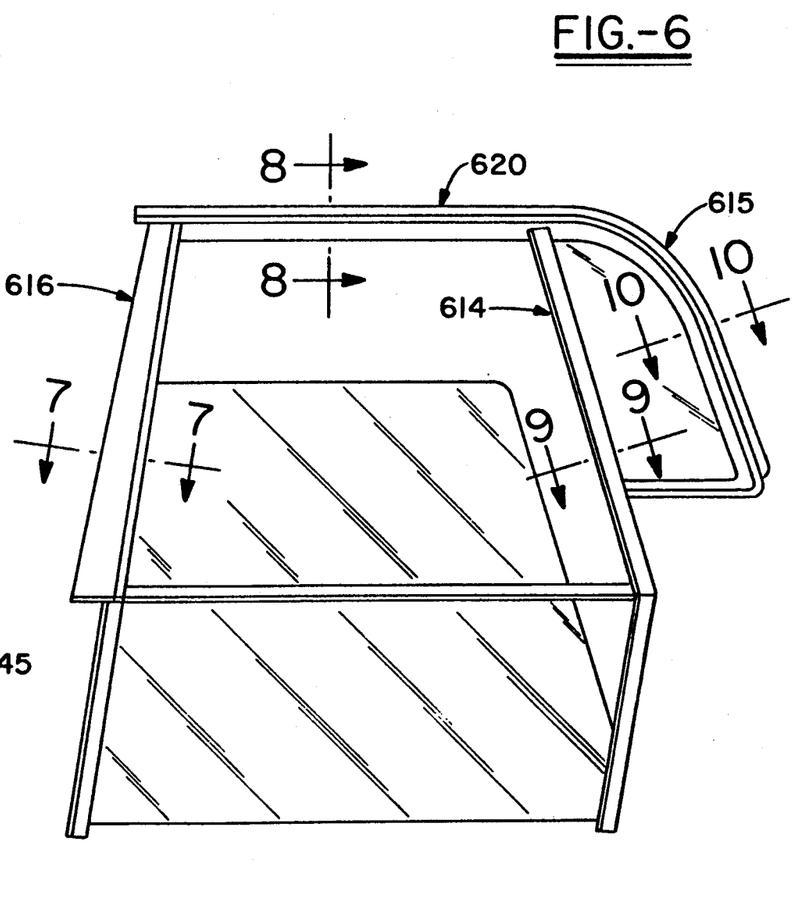
FIG. 6 is a view similar to FIG. 1, of the upper frame of an automotive rear door.

This construction has the advantage of permitting the gasket 112 to form a complete seal about the upper window enclosure as shown in FIG. 1 and FIG. 6. Thus, one continuous gasket 112 may extend up the A-pillar across the header and down the B-pillar. For example, channel mount portion 34 of the window receiving sealing trim strip 28 may be co-extruded with the exterior trim and sealing portion 80 and the pigtail 70. The longitudinal extrudate may be transfer molded to form the angles as the juncture of the header and the two pillars, and then one extruded gasket strip 112 with the low friction coating can be transfer molded to form the angles and then inserted into the groove 120 along the A-pillar, the header and the B-pillar. The A-pillar and the bottom of the vent may be sealed by belt strip and foam if required. The window receiving sealing trim strip 28 is then notched in the header to receive the division bar 14. The header lip 95 contacts the division bar 14 and forms a seal. A gasket 212 corresponding to the gasket 112 is inserted into position into the groove 220 to form a seal. Thus, the window has a continuous interior seal against the intrusion of wind, dirt, and water.

The construction of the division bar 14 is illustrated in FIG. 3. The division bar 14 includes a mounting member 334 which is comprised of a stiffer material, i.e. such as a thermoplastic elastomer having a durometer of from about 85 to about 100 preferably about 90 to about 95. The mounting member 334 has an internal channel 336 which receives a U-shaped stamped inner metal 338. The mounting member 334 is secured to the upper door frame 340 by means of one or more screws 342 that lock the pin 342 into position on the inner metal 338. The mounting member 334 includes an interior inner face 344 which interfaces with the exterior surface of the upper door frame 340. At one end the mounting member includes a groove 345 while the other side forms a tapered flange 346. An interior trim member 350 includes a curved side 351 which locks into the groove 345 and an eared side 352 having a gentler curve which snaps into position over the tapered flange 346 and is thereby biased into position over the upper door frame.

The mounting member 334 includes a first glass receiving channel for the vent window. This channel comprises a soft sealing member 361 and a lip 362 opposite the sealing member 361. The sealing member 361 and the lip 362 are curved toward each other to form a resilient embracing contact with the glass. A second glass receiving channel is formed opposite this first channel to receive the moveable window pane. The second channel is comprised of a sealing gasket 212 which is similar to the gasket previously described and further a sealing lip 370 is formed opposite the gasket 212 where the softer trim portion 380 has a fold back into the window aperture. The trim portion is made of a suitable material such as an thermoplastic elastomer having a durometer of about 60 to about 75, preferably about 70 to about 75; while the mounting member has a durometer of about 85 to about 100, preferably about 90° about 95 Shore A. The trim portion 380 may also include an appearance surface such as the groove portion 382.

FIG. 4 represents a view of the header section corresponding generally to the view of the A-pillar section of FIG. 2. The header section includes substantially the same members, such as a rigid U-shaped mounting portion 432 having an internal channel 434 which cooperates with a mount flange of the upper door frame. The mounting member includes internal serrations 462 which bias the window receiving sealing trim strip 428 onto the door frame. A more flexible trim and sealing portion 480 is formed integral to the bottom of the U-shaped mounting member 432 and includes a cut-line seal 482 and includes a T-shaped sealing member 484 having an arm 456 connected to a cross arm 488 forming the bottom of the glass run channel 430 and having a lip 495 which seals the exterior surface of the window.

The window receiving sealing trim strip 428 also includes a exterior leg 410 positioned exterior to the automobile but interior to the window. This member has a gasket member 412 made of a flexible material and having a low friction glass contacting surface 414. The interior side of the leg 410 includes a first finger 501 and a second finger 502. These cooperate with the flange 503 and the ridge 504 of a mount clip 505 to hold the window receiving sealing trim member 428 in position on the header. The clip 505 is held onto the metal stamping 443 and the door frame 445 by means of a pin member 454.

FIG. 5 is a view in cross section of the window receiving sealing trim strip 528 taken along line 5—5 in FIG. 1. The strip 528 shown in FIG. 5 has a mount portion 532 which corresponds generally to the cross section of the exterior leg 410 of the window sealing trim strip 428 shown in FIG. 4. The window receiving sealing trim strip 528 includes a glass run channel 530 which is comprised of a first exterior sealing member 595 and an interior gasket 512. Both members are formed of more flexible material, such as an EPDM rubber or thermoplastic elastomer having a durometer of from about 60 to about 75, and more preferably from about 70 to about 75 Shore A. The members are formed integral with or joined to become part of the mount member 532. As is shown, the gasket 512 has a anchor portion 516 which is inserted into a groove 518 in a mount portion 532. The gasket also includes a low friction sealing surface 514.

The lip 595 cooperates with the rear surface of an applique 580 having a flanged member 582 which receives a mounting flange 534 comprised of the upper door frame 545 and a mounting clip 540. The mounting clip 540 is secured to the upper door frame 545 by means of a pin member 554.

The upper door frame 545 and the mounting clip 540 form a second mounting flange 549 which receives an optional trim member 550 that could alternatively be formed as an integral part of the window receiving sealing trim strip 528. On the rear side, the applique member 580 includes a heel 562 which cooperates with a groove 560 in the exterior sealing portion of the window receiving sealing trim strip 528. The lip 595 further includes a recess 563 which cooperates with the terminus of the applique 580 to load the sealing member into position against the window.

The mount member 532 includes a flange 601 which cooperates with a shoulder 603 on the applique member 580. Thus, the window sealing receiving trim strip is biased into position relative to the applique and window.

Figure 7:
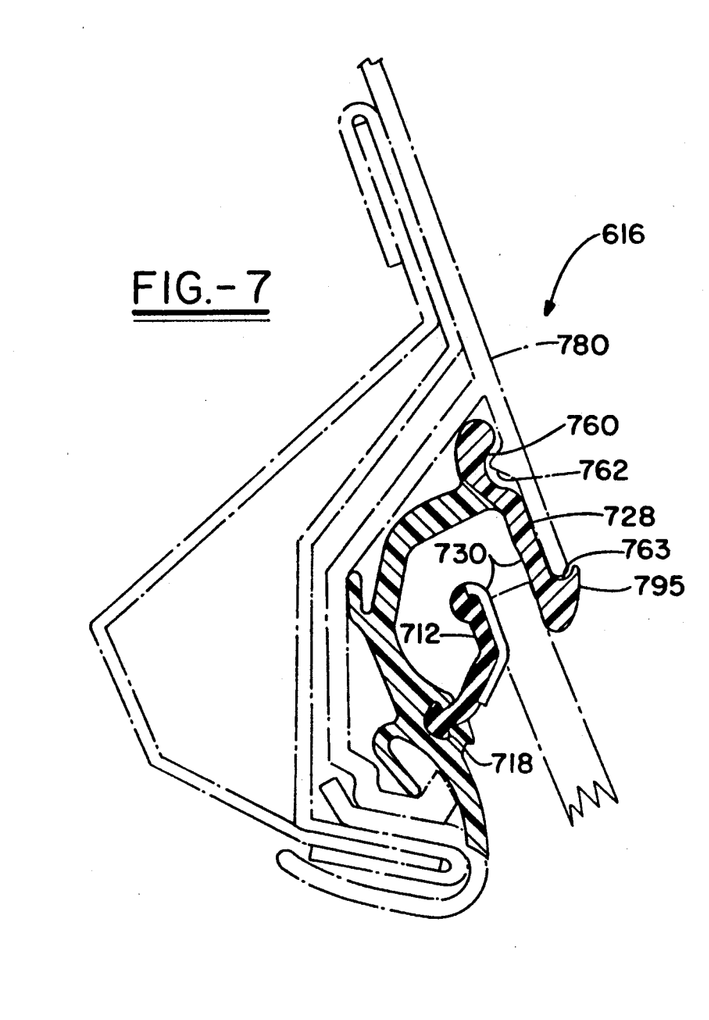
FIG. 7 is a view similar to FIGS. 2-5, taken on line 7—7 of FIG. 6.
Figure 8:
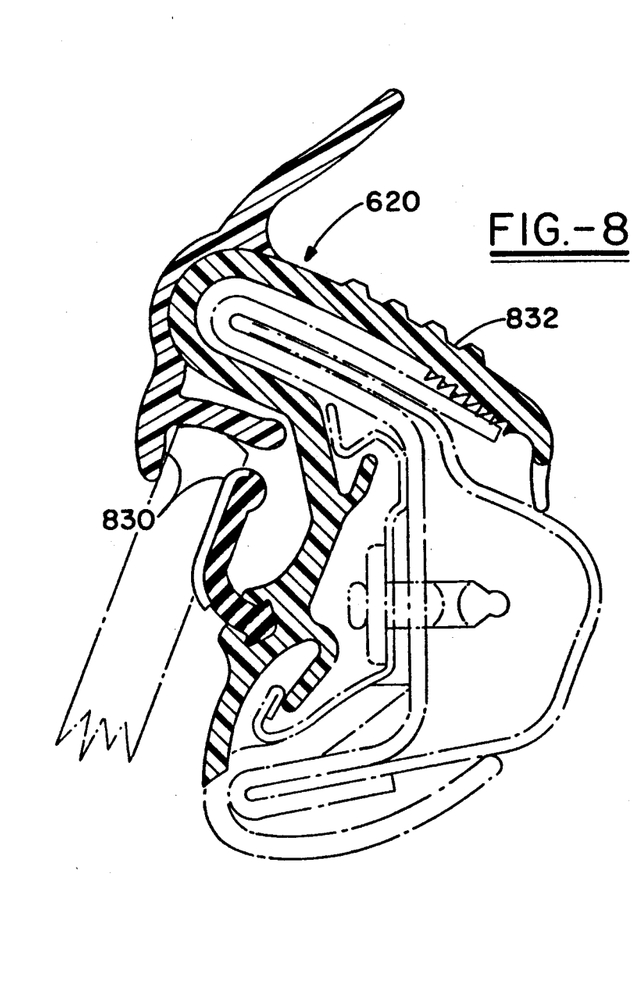
FIG. 8 is a view similar to FIG. 7, taken on line 8—8 of FIG. 6.

FIG. 6 illustrates a window enclosure for a rear window corresponding generally to the window enclosure shown in FIG. 1 having a B-pillar 616 also known as a center pillar on a four door vehicle, a header 620, a division bar 614 and a C-pillar 615. FIG. 7 illustrates a cross section of the window sealing receiving trim strip 728 corresponding to the cross section at FIG. 7 and having members as generally described for FIG. 5. The window receiving sealing trim member 728 generally includes a lip 795 with a groove 763 cooperating with a terminus of the applique 780. The lip 795 includes a groove 760 which receives a peak 762 on the exterior portion of the applique member 780. The glass run channel 730 is formed between the lip 795 and a gasket 712 formed of a softer durometer rubber and inserted in a groove 718 in the sealing member 728. FIG. 8 is a cross section of the header 620 having a glass run channel 830 and a U-shaped mount member 832 as well as other components as called out with regard to FIG. 4.

Figure 9:
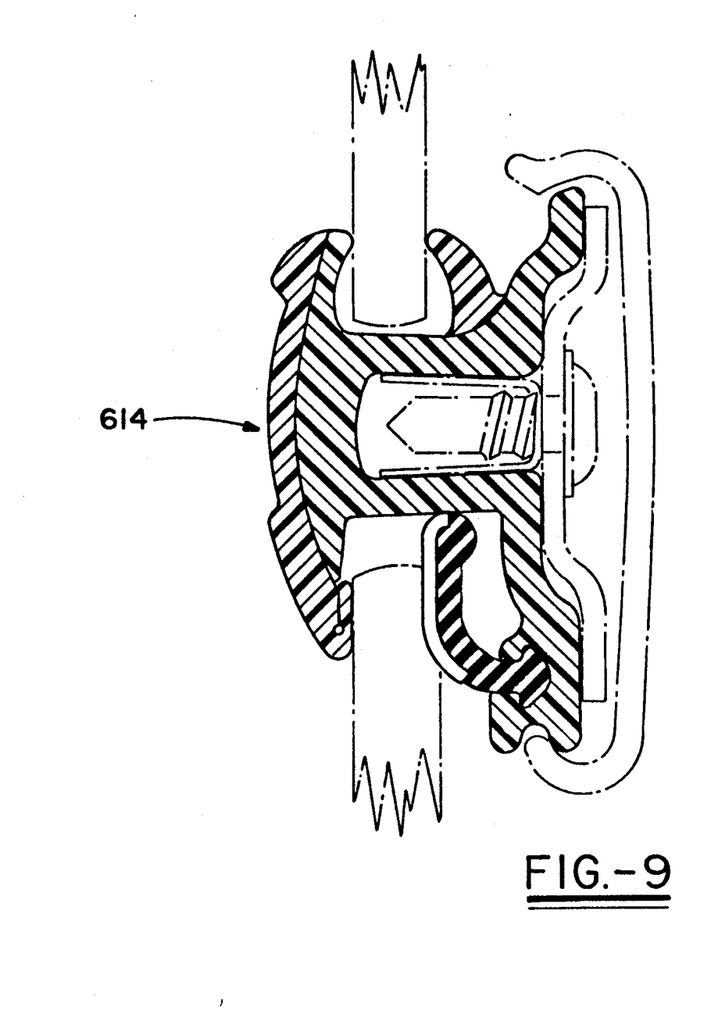
FIG. 9 is a view similar to FIG. 7 and 8 taken on line 9—9 of FIG. 6.
Figure 10:
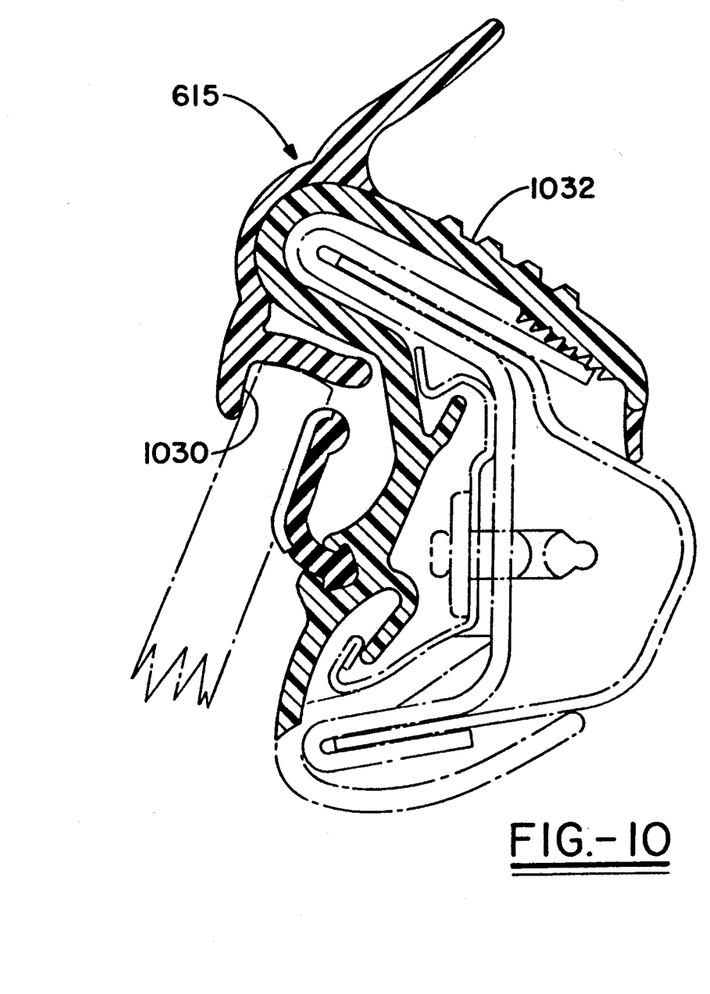
FIG. 10 is a view similar to 7-9, taken on line 10—10 of FIG. 6.

Similarly, FIG. 9 illustrates the division bar 614 having components as called out for FIG. 3 and FIG. 10 illustrates the D-pillar 615 having a mount member 1032 and a glass run channel 1030 as well as the other components described relative to FIG. 4.

Figure 11:
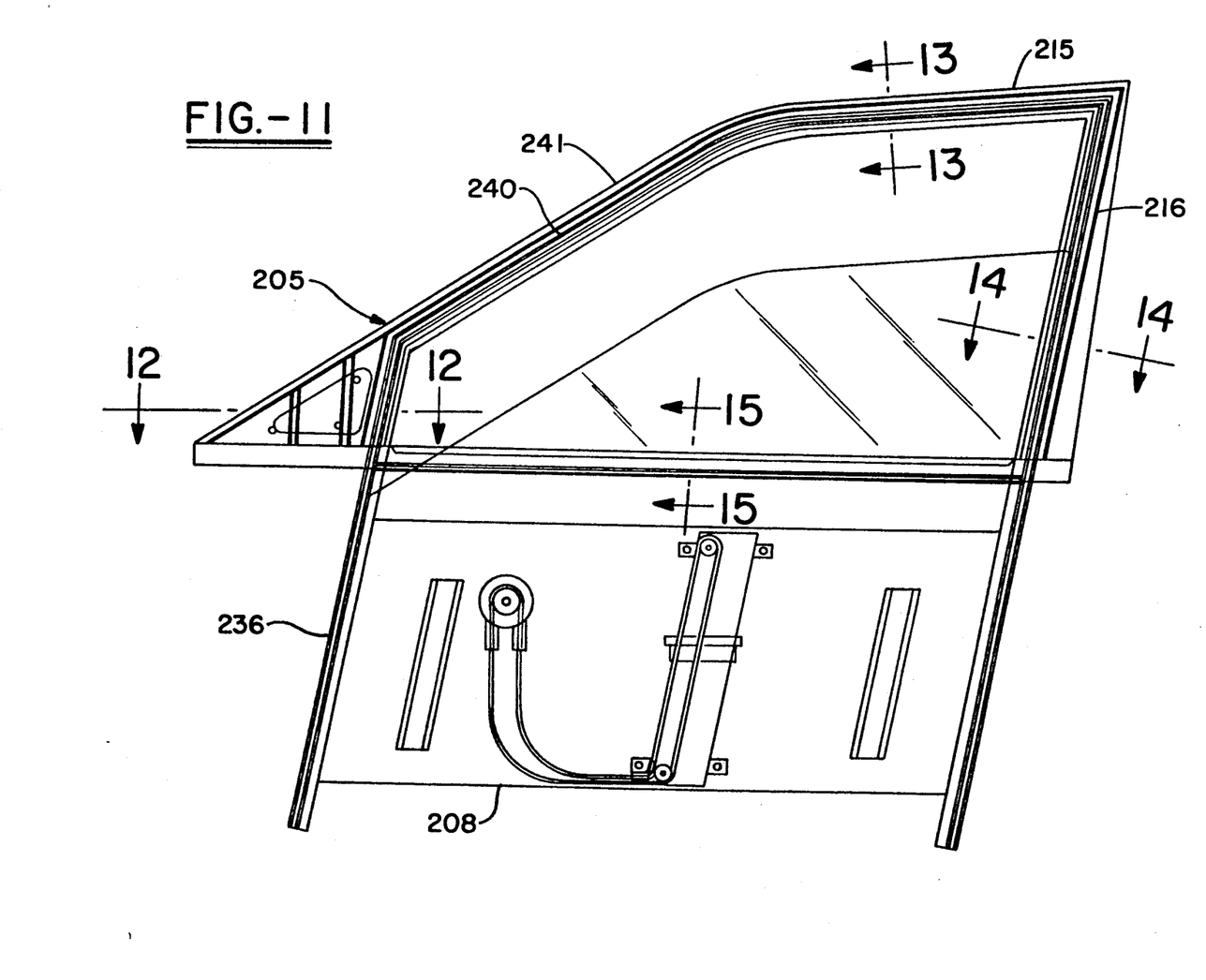
FIG. 11 is an exterior elevational view of an automotive front door including a second embodiment of the window enclosure of the present invention.

In accordance with the second mode of the invention, a window cassette assembly is presented in FIG. 11 having a unified window sealing strip constructed of a first and second frame member. The strip provides a glass run channel, reveal moldings, and sealing members for the window as well as for the cut line.

FIG. 11 illustrates for an automotive door a glass door cassette assembly 205 in accordance with the second embodiment of the invention. The glass cassette assembly includes a continuous perimeter frame 240 which consists of a pair of laterally spaced vertical side channels 236 shown in FIG. 11 and the upper window frame comprising a first frame portion at the apex and a second frame portion which runs up the A pillar 241 across the header 215, and down the B pillar 216. These elements form a functional or an operational framework in which the windowpane may be operatively raised or lowered. The cassette may be anchored into the door by means of the side channels 236. In general, the side channels 236 and the door frame 225 are formed of fabricated members stampings which are rolled or stamped and welded where necessary.

The cassette assembly further includes a movable primary window pane 208 which is shown in a partially closed position. Regulator means are included within the door for raising and lowering the window pane 208. Optionally, the assembly may include a side vent.

The cassette assembly 205 includes one or more window frame members along the perimeter of the window. In particular, the perimeter assembly includes a first frame portion shown in cross-section FIG. 12, which extends along the lower portion of the A-pillar. This frame portion includes a rigid base 223 which has glass run channel 209 bonded to an interior flexible sealing flange 227 on the interior side of the window, and an exterior flexible sealing flange 229 on the exterior side of the window.

Figure 12:
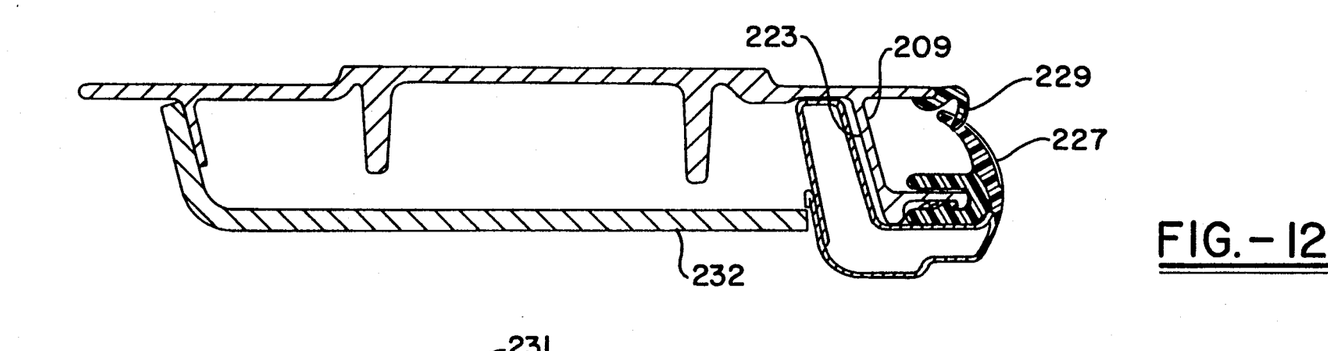
FIG. 12 is a sectional view taken on line 12—12 of FIG. 11, particularly showing the window enclosure of the second embodiment of the present invention.

The flexible flanges 229, 227 are made of a suitable material such as flexible polyurethane, i.e., having a durometer of from about 60 to about 80 on the Shore A scale, preferably from about 70 to about 75. These flanges may include a low friction glass engaging surface, such as flocking or low friction functional coating.

A suitable method of making the frame member is multi-part reaction injection molding (RIM) in which the rigid base is made of high modulus urethane while the sealing flanges are molded in place with a lower durometer thermoplastic urethane.

The channel 209 has an interior leg ending in a shoulder that locks against a lip on the interior surface of the mounting channel member of the interior sealing flange 227. The mounting channel member is integral with the sealing flange but is formed of a stiffer material such as a polyurethane having a durometer from about 85 to about 100, and preferably from about 90 to about 95 Shore A. The dual durometer aspect of the sealing flange has the effect of isolating the sealing functions from the mounting functions. The composite is made by suitable means such as by coextrusion, or by otherwise adhering the different materials together. The base member 223 is formed of a more rigid material, such as a molded polyurethane having a flex modulus of from about 75,000 psi to about 500,000 psi, preferably from about 100,000 psi to about 300,000 psi. As shown, the base member includes an exterior wall which forms the apex of the window frame which may receive a side mirror.

The first frame portion cooperates with the door frame mount member 225, which abuts the side of the glass run channel 209 which is opposite the window pane contacting surface. The base member 223 extends into an interior apex wall 232 which finishes the interior apex of the window frame.

Figure 13:
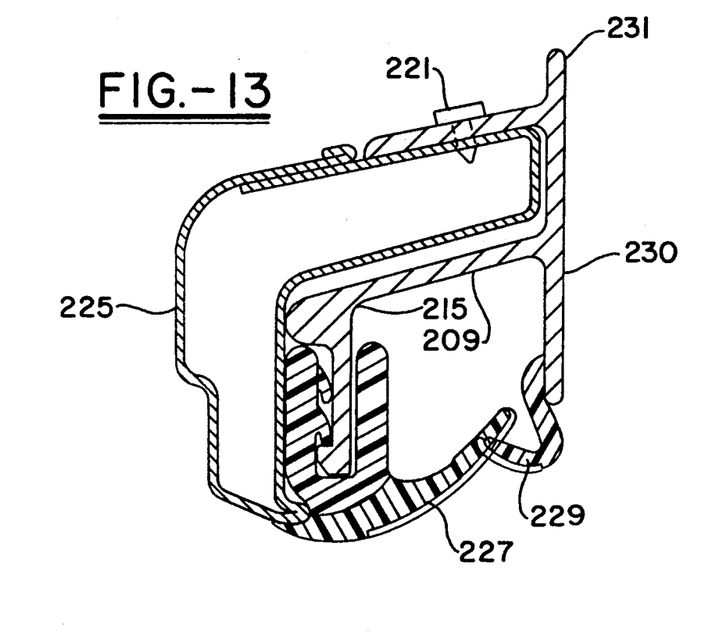
FIG. 13 is a sectional view similar to FIG. 12 taken on line 13—13 of FIG. 11.
Figure 14:
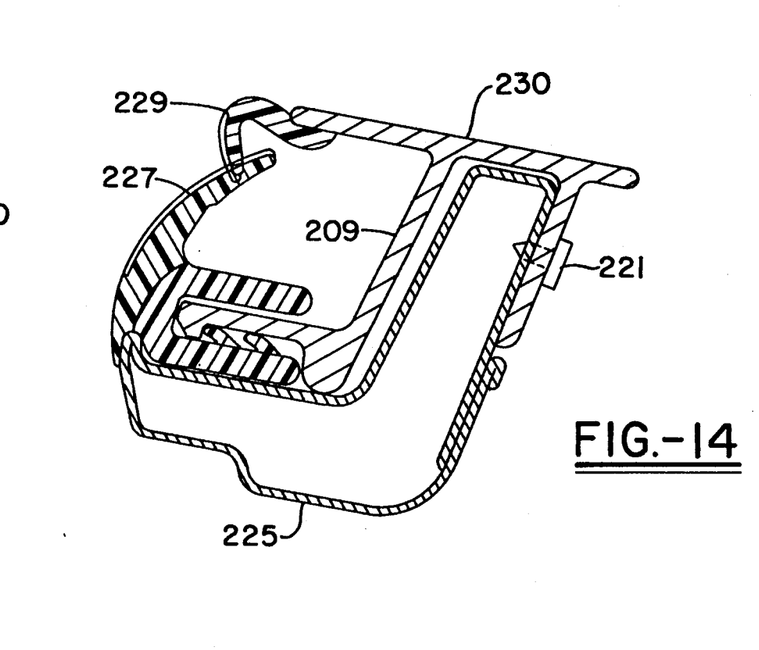
FIG. 14 is a sectional view similar to FIG. 12 taken on line 14—14 of FIG. 11.
Figure 15:
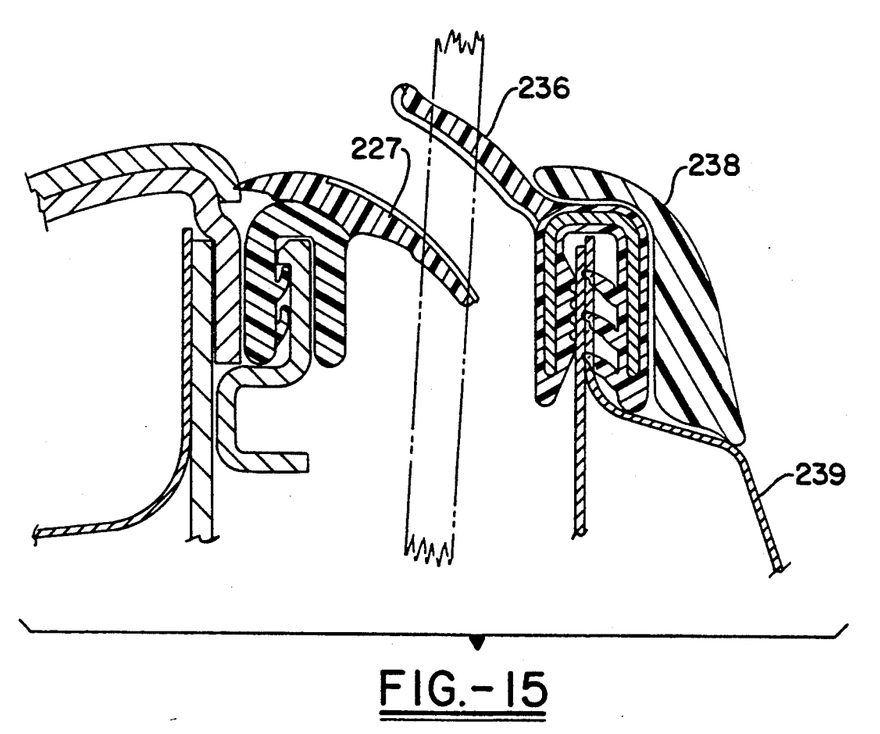
FIG. 15 illustrates a window pane in phantom at the beltline of the window and includes an interior sealing flange, an exterior sealing flange 236 mounted on the door 239. Trim strip 238 finishes the exterior beltline.

A second frame portion extends up the A-pillar, along the header and the B-pillar and is shown in cross section in FIGS. 13 and 14. The second frame member includes the base/member 223 having a glass run channel section 209 joined to an exterior sealing flange 229 and an interior sealing flange 227 as previously described. Further, the interior sealing flange has a harder mounting channel which cooperates with the interior leg 215 of the base/glass run channel 230. The exterior surface of the base member 223 provides a flat exterior trim surface 230 known as a reveal molding or window exterior show surface.

A door frame member 225 cooperates with a tail of the sealing flange 227 to form a clean profile and a joint sealed against the intrusion of noise, water and dirt. One or more screws 221 hold the base member 232 in position relative to the mount flange area on the door frame member 225. The glass run member includes a tail 231 which forms a closeout at the cutline, however, it should be understood that a softer durometer material may be used for the tail to form a cutline seal.

While in accordance with the Patent Statutes, the best mode and preferred embodiment has been set forth, the scope of the invention is not limited thereto, but rather by the scope of the attached claims.

What is claimed is:

1. A window enclosure strip for a movable windowpane mounted in a vehicle door, said door including a mount member, said enclosure strip comprising;
   a relatively rigid polymeric mount channel capable of being fixed onto said mount member and having a first side wall and a second side wall connected by a transverse web;
   a glass run channel having a relatively flexible polymeric interior sealing lip and a relatively flexible polymeric exterior sealing lip, each of said lips having glass contacting surfaces being biased into a sealing contact with said window pane when said window pane is in a closed position in said vehicle and said glass run channel including a relatively flexible lateral glass contacting surface which is capable of contacting a lateral edge of said window pane and which is at least partially coextensive with a side wall of said mount channel, and said interior sealing lip comprising a continuous web having an anchoring edge, said anchoring edge cooperating with a continuous groove, said continuous groove being formed in a wall of said mount channel;
   an exterior reveal trim member having a lateral interior surface and a lateral exterior surface, said lateral interior surface being at least partially adjacent the transverse channel of said mount channel and said lateral exterior surface forming a smooth continuous wind contacting surface and being at least partially co-extensive with said exterior sealing lip of said glass run channel; and
   said mount channel, said glass run channel and said exterior reveal trim member being an integral unit having functionally isolated components.

2. A window enclosure strip as set forth in claim 1, wherein said mount channel is substantially self-supported.

3. A window enclosure strip as set forth in claim 1, wherein said mount channel includes a ridge which projects into said mount channel and which cooperates with said mount member to bias said mount channel into position on said mount member.

4. A window enclosure strip as set forth in claim 3, wherein said mount channel includes a series of said ridges.

5. A window enclosure strip as set forth in claim 4, wherein said mount channel includes an extending lip, said lip cooperating with said door so as to seal said channel and said window from intrusion by dust.

6. A window enclosure strip as set forth in claim 5, wherein said lip is formed of a material which is softer than the material of said channel.

7. A window enclosure strip as set forth in claim 1, wherein said channel includes at least one stiffening shoulder.

8. A window enclosure strip as set forth in claim 1, wherein said exterior sealing lip has a laterally extending leg including a laterally extending surface, said laterally extending surface being capable of contacting a window pane lateral surface, and said exterior sealing lip further comprising a longitudinally extending member, said longitudinal member contacting a longitudinal surface of said window pane.

9. A window enclosure strip as set forth in claim 8, further including a cut-line seal member, wherein said exterior sealing lip is integral with and distal to said cut-line seal member.

10. A window enclosure strip as set forth in claim 1, wherein said mount channel has a lateral surface which opposes said mount member, and said reveal trim member has a lateral surface which opposes the lateral surface of the mount channel.

11. A window enclosure strip as set forth in claim 1, wherein said window is a glass cassette window.

12. A window enclosure strip as set forth in claim 1, wherein said reveal trim surface extends backward into said glass run channel to form said exterior sealing lip, said exterior sealing lip having a glass contacting surface which is continuous with said reveal trim surface.

13. A window enclosure strip as set forth in claim 12, said interior sealing lip biases said movable window into contact with said glass contacting surface.

14. A window enclosure strip as set forth in claim 13, wherein said upper door frame is an integral portion of a window glass cassette.

* * * * *